March 12, 1968  H. VISSERS  3,372,877
APPARATUS FOR SPREADING POWDERED OR GRANULAR FERTILIZERS
Filed April 8, 1966
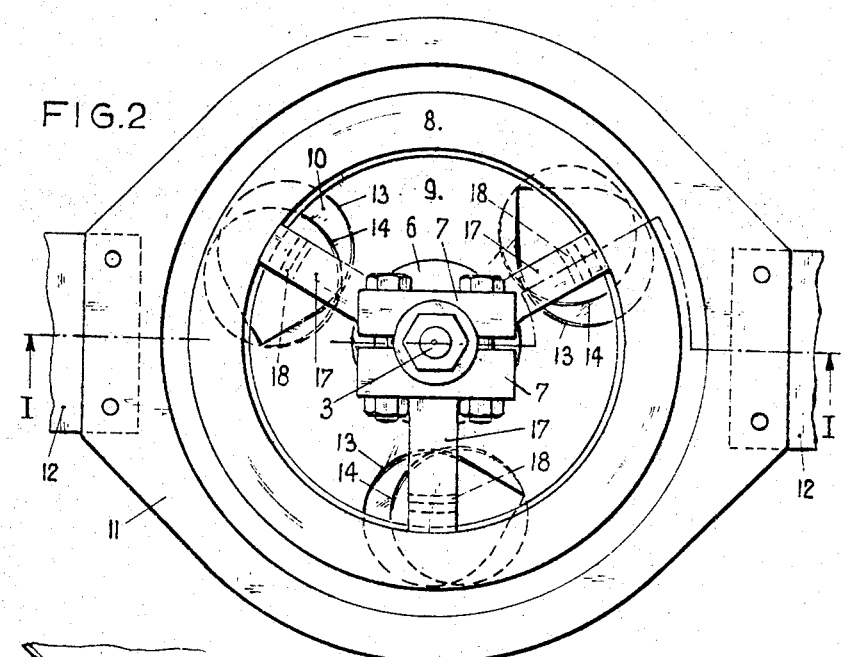
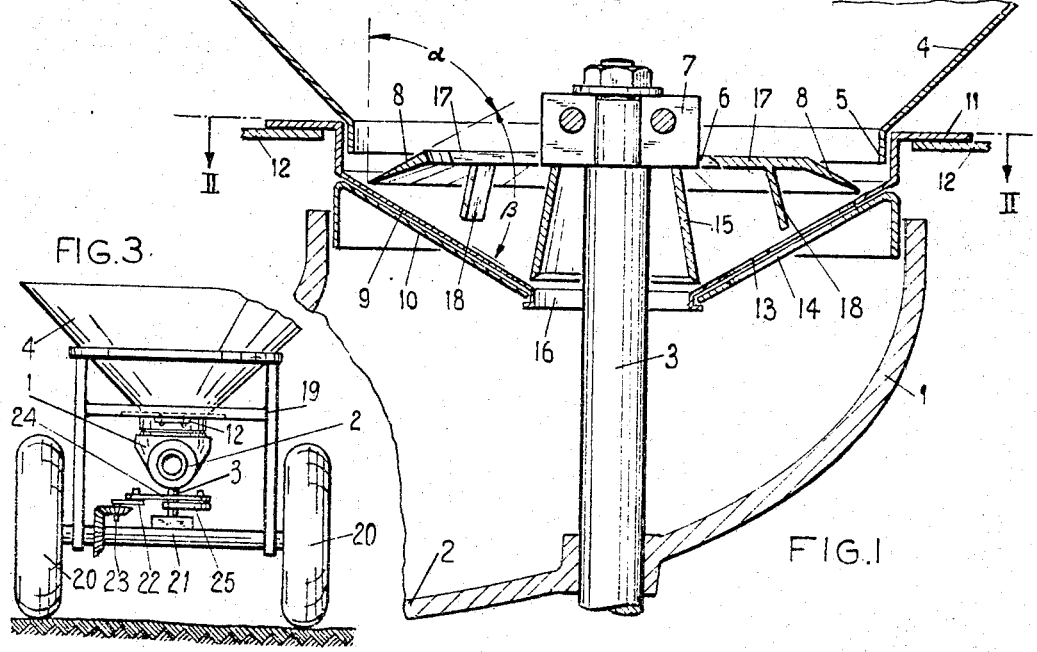
INVENTOR
HERBERT VISSERS
BY
ATTORNEY

United States Patent Office 3,372,877
Patented Mar. 12, 1968

3,372,877
APPARATUS FOR SPREADING POWDERED OR GRANULAR FERTILIZERS
Herbert Vissers, Nieuw Vennep, Netherlands, assignor to Landbouwwerktuigen- en Machinefabriek H. Vissers N.V., Netherlands, a company of the Netherlands
Filed Apr. 8, 1966, Ser. No. 541,232
Claims priority, application Netherlands, May 3, 1965, 65—5,595
3 Claims. (Cl. 239—659)

ABSTRACT OF THE DISCLOSURE

The invention relates to an apparatus for spreading powdered or granular fertilizers, provided with a storage hopper, supported by a travelling frame and having a bowl arranged below the discharge mouth of the hopper, said bowl having a spout provided with at least one outlet-hole and extending opposite to the travelling direction of the frame, driving means being provided for angularly reciprocating said bowl with said spout on a vertical shaft and said shaft carrying agitator means located in the lower part of the hopper, two super-imposed discs provided with passage holes being located between the outlet mouth of the hopper and the bowl and one of said discs being angularly adjustable with respect to the other disc.

---

With the known fertilizer spreading apparatus of this type the discs arranged below the hopper consist of flat plates and the agitator surrounded by a ring rotates above said discs. Said agitator considerably stirs the fertilizer in the lower part of the hopper, whereby the grains of the material are pulverized in undesired manner. Moreover the ring or rim of the agitator which is not exactly circular exerts a radial pressure on the fertilizer surrounding said ring, whereby a hard crust is formed extending also below the ring on the uppermost disc and clogs the passage holes in said disc. The fertilizer lying between the passage holes on the disc is pulverized by the ring and thereby a crust will be formed on the disc.

The invention has for its object to prevent the fertilizer from being pulverized and from adhering to the discs and to the wall at the outlet mouth of the hopper. According to the invention the superimposed discs provided with passage holes are shaped as a cone having its wall sloping downwards and the agitator being also provided with a conical circumferential ring which with its base is directed downwards. With said arrangement the agitator will cause less disturbance in the fertilizer contained in the lower part of the hopper, so that pulverization of the grains is avoided. The downwards directed circumferential ring of the agitator exerts an obliquely directed pressure on the fertilizer, so that the fertilizer at the upper side of the ring is practically not radially compressed, but will escape upwards. The fertilizer at the lower side of the conical circumferential ring will move down along the conical downwards sloping face and on the disc in order to fall down for the greater part in the bowl through the passage holes of the disc.

With a preferred embodiment of the apparatus according to the invention the conical discs are provided with a central hole and a sleeve is provided around the axis of the discs and said sleeve extends downwards at the agitator near to the upper disc, so that a slot is formed which during rotation of the agitator permits fertilizer remaining on the disc to pass to the bowl.

The invention will be further described with reference to the accompanying drawing showing an embodiment of the spreading apparatus according to the invention.

In the drawing FIG. 1 shows a sectional elevation of the lower part of the hopper and of the bowl located below the hopper and taken on line I—I in FIG. 2 which itself is a plan view of the agitator with the discs located below the agitator.

FIG. 3 is a rear view of the apparatus on a smaller scale.

The hopper 4 containing the fertilizer to be spread is supported in a frame 19 which may be provided with two groundwheels 20. Below the discharge end of hopper 4 a bowl 1 is mounted and secured to a vertical shaft 3 which is supported for rotation in a bearing 21. Bowl 1 is provided with a spout 2 having at both sides one or more openings and also at its end may be completely or partly open. Shaft 3 with the bowl 1 is angularly reciprocated by a crank 22 secured to a shaft 23 and connected by a rod 24 to a lever 25 secured on shaft 3 of the bowl.

The vertical shaft 3 of the bowl extends into the outlet mouth 5 of the hopper 4 and on the upper end of said shaft a hub 7 of an agitator 6 is clamped, said hub consisting of two parts. The agitator 6 is provided with a conical downwards directed circumferential ring 8.

Between the outlet mouth 5 of the hopper 4 and the bowl 1 two conical discs 9 and 10 are provided and the uppermost disc 9 of which with its flange 11 is secured to supports 12 attached to the frame. The disc 9 is provided with passage holes 13 having the shape of a half circle, completed by a triangular part. The lowermost disc 10 has circular passage holes 14 and is angularly adjustable, so that upon adjustment of said disc the area of the passage holes is varied and by the particular shape of the holes 13 the resultant passages obtained by adjusting disc 10 also for the smallest area will be more or less circular.

At the under side of the hub 7 of the agitator 6 a cylindrical or more or less conical sleeve 15 is provided which at the central opening 16 of discs 9 and 10 only leaves a narrow gap of e.g. about 1 mm. When the apparatus is out of operation and the passage holes 13, 14 in discs 9, 10 are completely closed by the adjustment of the disc 10 practically no fertilizer can escape through said gap below sleeve 15. If desired the width of said gap may be varied by vertically adjusting the agitator 6 on its shaft 3.

During operation of the apparatus fertilizer lying on the disc 9 rather remote from the passage holes 13 will pass through the central opening 16 downwards to the bowl 1.

Below each spoke 17 connecting the circumferential ring 8 of the agitator 6 to the hub 7 a blade 18 is secured at the underside thereof in such a manner that said blade moves above the holes 13 of disc 9 for promoting the passage of the fertilizer through the holes and preventing clogging of said holes 13 by clods contained in the material. The slope of the conical ring 8 has an influence on the passage of the fertilizer at the circumference of the ring and also the slope of the conical wall formed by the discs 9, 10 has an influence on the regular discharge of the material. Very favourable results have been obtained when the angle $\alpha$ of the ring 8 is about 60° and the angle $\beta$ between said ring and the conical wall formed by discs 9 and 10 is also about 60°. It appeared that the angle $\alpha$ may vary from 70° to 45° and about the same limits also apply to the angle $\beta$.

What I claim is:

1. In an apparatus for spreading powdered or granular fertilizers, provided with a storage hopper supported by a travelling frame and having a bowl arranged below the discharge mouth of the hopper, said bowl having a spout provided with at least one outlet hole and extending opposite to the travelling direction of the frame, driving means being provided for angularly reciprocating said bowl with said spout on a vertical shaft and said shaft carrying agitator means located in the lower part of the hopper, two superimposed discs provided with passage holes being located between the outlet mouth of the hopper and the bowl, one of said discs being angularly adjustable with respect to the other disc, wherein the improvement comprises said discs being shaped as a cone having its wall sloping downwards and the agitator being also provided with a conical circumferential ring which with its base is directed downwards.

2. Apparatus as claimed in claim 1, characterized in, that the conical discs are each provided with a central hole and a sleeve is arranged around the axis of said discs and said sleeve extends downwards from the agitator near to the uppermost disc, in such a manner, that a slot is formed which during rotation of the agitator permits fertilizer to pass to the bowl.

3. Apparatus as claimed in claim 1, characterized in, that the conical circumferential ring of the agitator encloses an angle of about 60° with the vertical, the angle between said ring and the conical discs being also about 60°.

References Cited

UNITED STATES PATENTS

| | | | |
|---|---|---|---|
| 3,059,935 | 10/1962 | Vissers | 239—659 |
| 3,097,852 | 7/1963 | Steketee | 239—659 |

FOREIGN PATENTS 665,055  6/1963  Canada.

M. HENSON WOOD, JR., *Primary Examiner.*

H. NATTER, *Assistant Examiner.*